US006622847B2

(12) United States Patent
Schuitema et al.

(10) Patent No.: US 6,622,847 B2
(45) Date of Patent: *Sep. 23, 2003

(54) COMPACT ARTICLE UNSCRAMBLER

(75) Inventors: Dennis J. Schuitema, Ada, MI (US); Ronald J. DeVree, Hudsonville, MI (US); Curtis E. LeMay, Shelbyville, MI (US)

(73) Assignee: Rapistan Systems Advertising Corp., Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/921,720

(22) Filed: Aug. 3, 2001

(65) Prior Publication Data

US 2001/0048868 A1 Dec. 6, 2001

Related U.S. Application Data

(60) Division of application No. 09/131,917, filed on Aug. 10, 1998, now abandoned, which is a continuation-in-part of application No. 08/616,685, filed on Mar. 15, 1996, now Pat. No. 5,918,723.

(51) Int. Cl.$^7$ .............................................. B65G 47/24

(52) U.S. Cl. ................ 198/399; 198/370.09; 198/370.1

(58) Field of Search .................. 198/370.09, 370.1, 198/398, 399, 457.02

(56) References Cited

U.S. PATENT DOCUMENTS

| 1,990,549 A | 2/1935 | Kimball |
| 2,629,481 A | 2/1953 | Stover |
| 2,662,632 A | 12/1953 | Black et al. |
| 2,763,359 A | 9/1956 | Rose |

(List continued on next page.)

FOREIGN PATENT DOCUMENTS

| DE | 1263644 | 3/1968 | ................ 198/580 |
| DE | 2049627 | 4/1971 | |

(List continued on next page.)

OTHER PUBLICATIONS

Publicly disclosed system.
Enlarged view of A–1, publicly disclosed system.

*Primary Examiner*—Joseph E. Valenza
(74) *Attorney, Agent, or Firm*—Van Dyke, Gardner, Linn & Burkhart, LLP

(57) ABSTRACT

A compact article singulation and accumulation conveyor includes a receiving portion which receives articles in random order including clusters of side-by-side articles and a discharge portion from which articles are discharged in a single file singulated stream. A first conveying surface transports articles longitudinally from the receiving portion to the discharge portion. A recirculating bed removes side-by-side articles from a downstream portion of the first conveying surface to an upstream portion of the first conveying surface. The recirculating bed is made up of at least one peel-away conveyor having a second conveying surface adapted to move side-by-side articles laterally off the first conveying surface, at least one coupling conveyor having a third conveying surface adapted to move articles from the second conveying surface upstream and at least one return conveyor having a fourth conveying surface adapted to move articles from the third conveying surface to the first conveying surface. Each of the conveying surfaces may be defined by the upper surfaces of a plurality of powered rollers or traveling belts. Clusters of articles tend to recirculate around the recirculation bed and the first conveying surface and provide contact accumulation thereon as individual articles of the cluster are pulled away along the first conveying surface. An output section diverts packages having a width transverse the direction of conveyor travel which is greater than a particular dimension, rotates diverted packages, and returns the rotated packages to the conveyor.

21 Claims, 15 Drawing Sheets

U.S. PATENT DOCUMENTS

| | | | |
|---|---|---|---|
| 2,804,961 A | 9/1957 | Carter | |
| 2,848,096 A | 8/1958 | Luginbühl | |
| 2,988,195 A | 6/1961 | McHugh, Jr. | |
| 3,104,753 A | 9/1963 | Osborne | |
| 3,176,821 A | 4/1965 | Eldred et al. | |
| 3,177,568 A | 4/1965 | Schweiker | |
| 3,224,554 A | 12/1965 | Moulder et al. | |
| 3,232,411 A | 2/1966 | Kulig | 198/580 X |
| 3,239,086 A | 3/1966 | Kirkpatrick | |
| 3,286,813 A * | 11/1966 | Fuhrimann | 198/399 |
| 3,329,251 A | 7/1967 | Bilocq | |
| 3,342,012 A | 9/1967 | Reading | |
| 3,456,773 A | 7/1969 | Titmas, Jr. | |
| 3,604,551 A | 9/1971 | Fink | 198/347.1 X |
| 3,642,113 A | 2/1972 | Burgis | 198/370.09 |
| 3,734,267 A | 5/1973 | Tice | |
| 3,835,983 A | 9/1974 | Horii | |
| 4,037,710 A | 7/1977 | Brutcher | 198/347.1 X |
| 4,111,412 A | 9/1978 | Cathers | |
| 4,252,232 A | 2/1981 | Beck et al. | |
| 4,284,186 A | 8/1981 | Brouwer | |
| 4,356,908 A | 11/1982 | Embro, Jr. | |
| 4,431,104 A | 2/1984 | Orlowski et al. | 198/427 |
| 4,546,870 A | 10/1985 | Cogo | 198/400 |
| 4,730,718 A | 3/1988 | Fazio et al. | 198/370.1 |
| 4,815,580 A | 3/1989 | Schanz et al. | |
| 4,889,224 A | 12/1989 | Denker | |
| 5,147,023 A | 9/1992 | Meindl | |
| 5,222,586 A | 6/1993 | Ydoate et al. | |
| 5,240,101 A | 8/1993 | LeMay et al. | |
| 5,301,791 A | 4/1994 | Shampine | 198/347.4 X |
| 5,308,001 A | 5/1994 | Grecksch et al. | |
| 5,372,238 A | 12/1994 | Bonnet | |
| 5,400,896 A | 3/1995 | Loomer | |
| 5,415,281 A | 5/1995 | Taylor et al. | |
| 5,531,311 A | 7/1996 | LeMay et al. | 198/448 |
| 5,701,989 A | 12/1997 | Boone et al. | 198/448 |
| 5,735,388 A | 4/1998 | Brouwer | 198/699.1 |
| 5,738,202 A | 4/1998 | Ydoate et al. | |
| 5,769,204 A | 6/1998 | Okada et al. | 198/443 |
| 5,868,238 A | 2/1999 | Bonnet | 198/370.1 |
| 5,918,723 A | 7/1999 | Schuitema et al. | |
| 6,056,107 A | 5/2000 | Schuitema et al. | 198/347.4 |
| 6,253,905 B1 | 7/2001 | Pelka | 198/456 |
| 6,269,933 B1 * | 8/2001 | Schuitema et al. | 198/320.1 |

FOREIGN PATENT DOCUMENTS

| | | | |
|---|---|---|---|
| DE | 3613724 A1 | 10/1987 | |
| DE | 4324536 A1 | 1/1995 | |
| EP | 0414210 A1 | 2/1991 | |
| EP | 0780328 A | 6/1997 | |
| EP | 0795497 A | 9/1997 | |
| GB | 2013637 A | 8/1979 | |
| GB | 2061856 A | 5/1981 | |
| GB | 2256844 A | 12/1992 | |
| JP | 0051415 | 3/1986 | 198/347.1 |
| WO | WO8101281 | 5/1981 | |
| WO | WO0043300 | 7/2000 | |

* cited by examiner

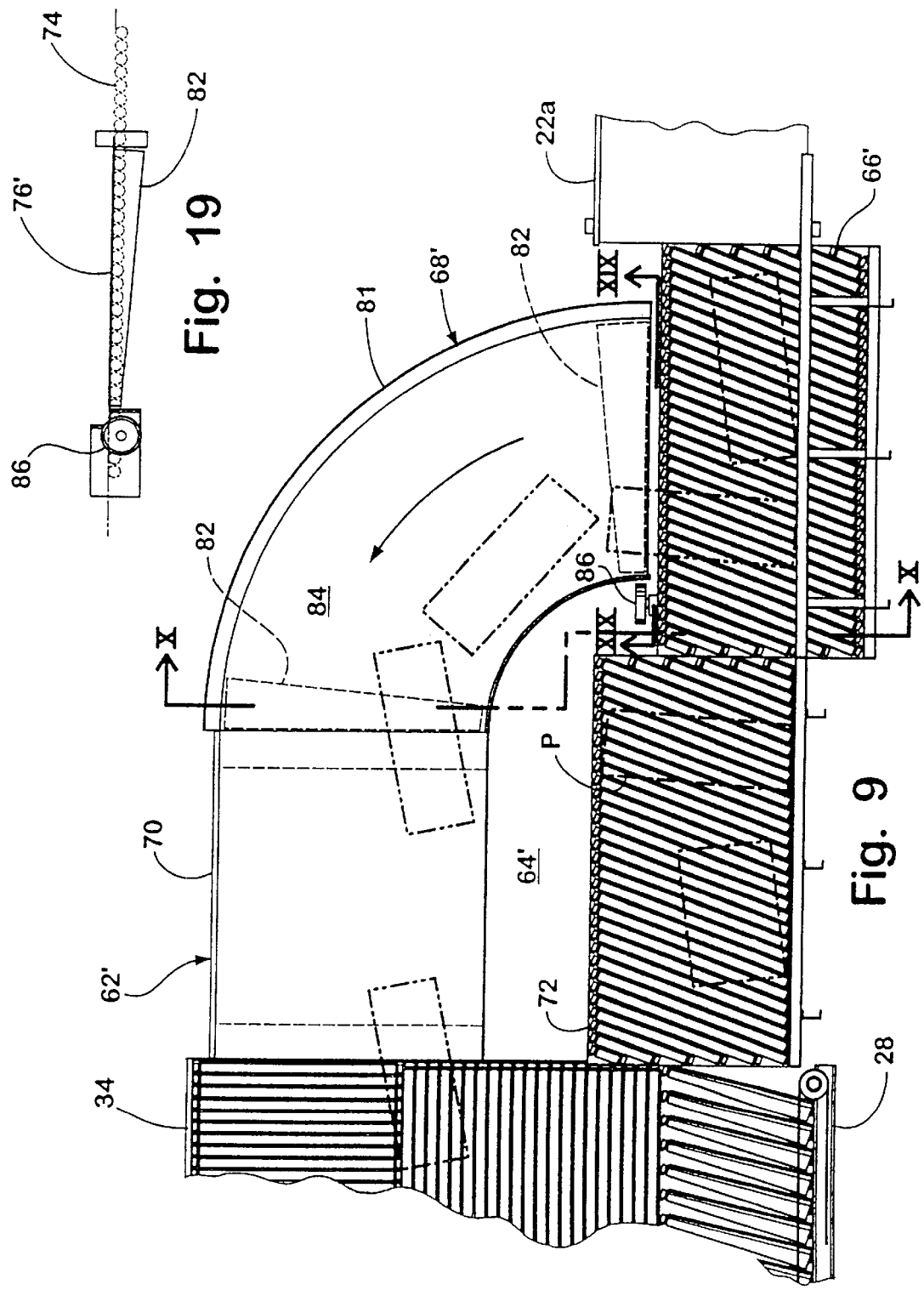

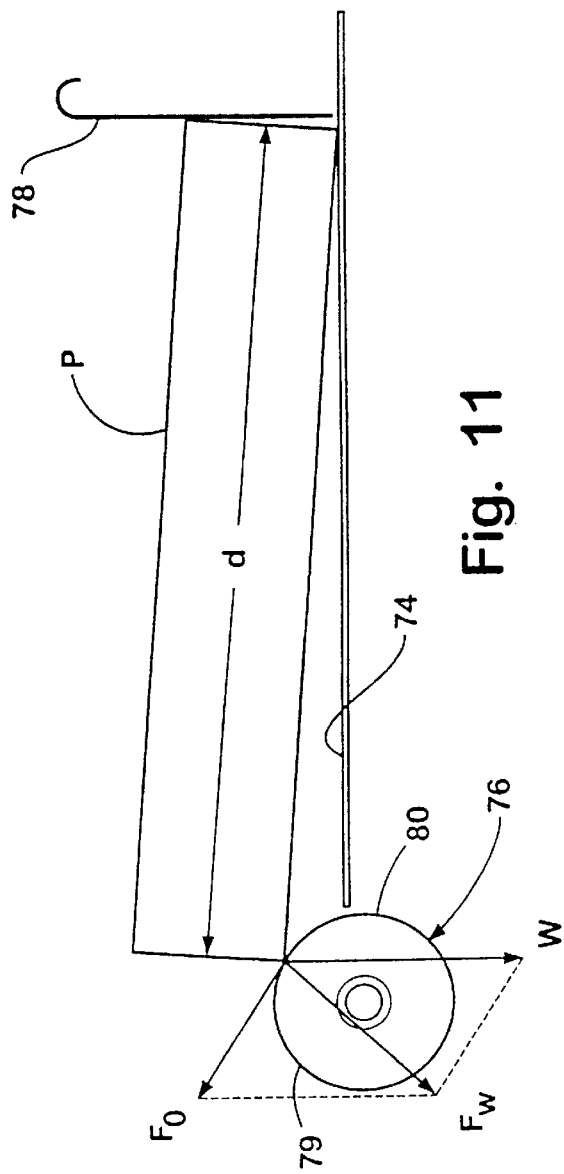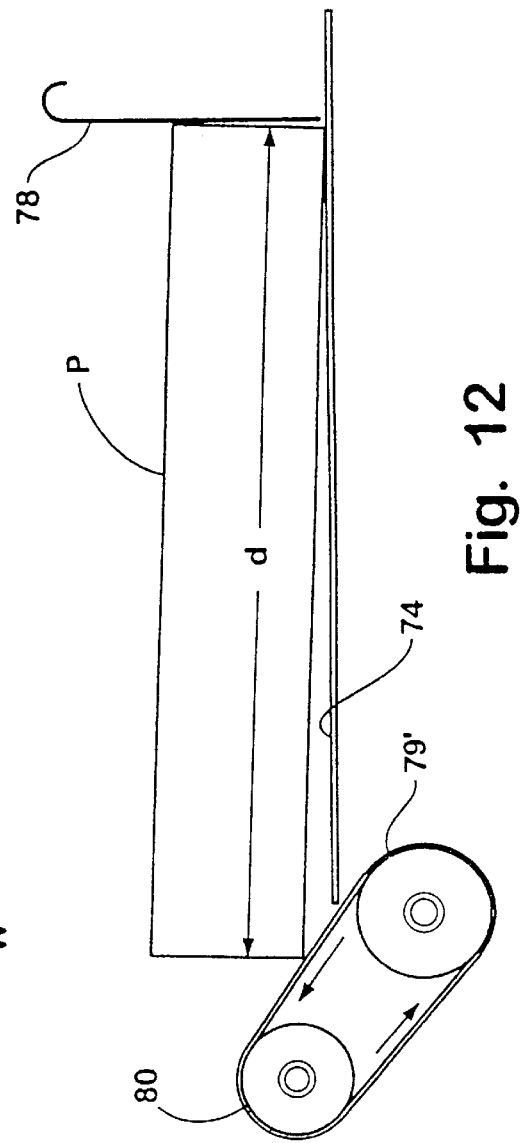
Fig. 11
Fig. 12

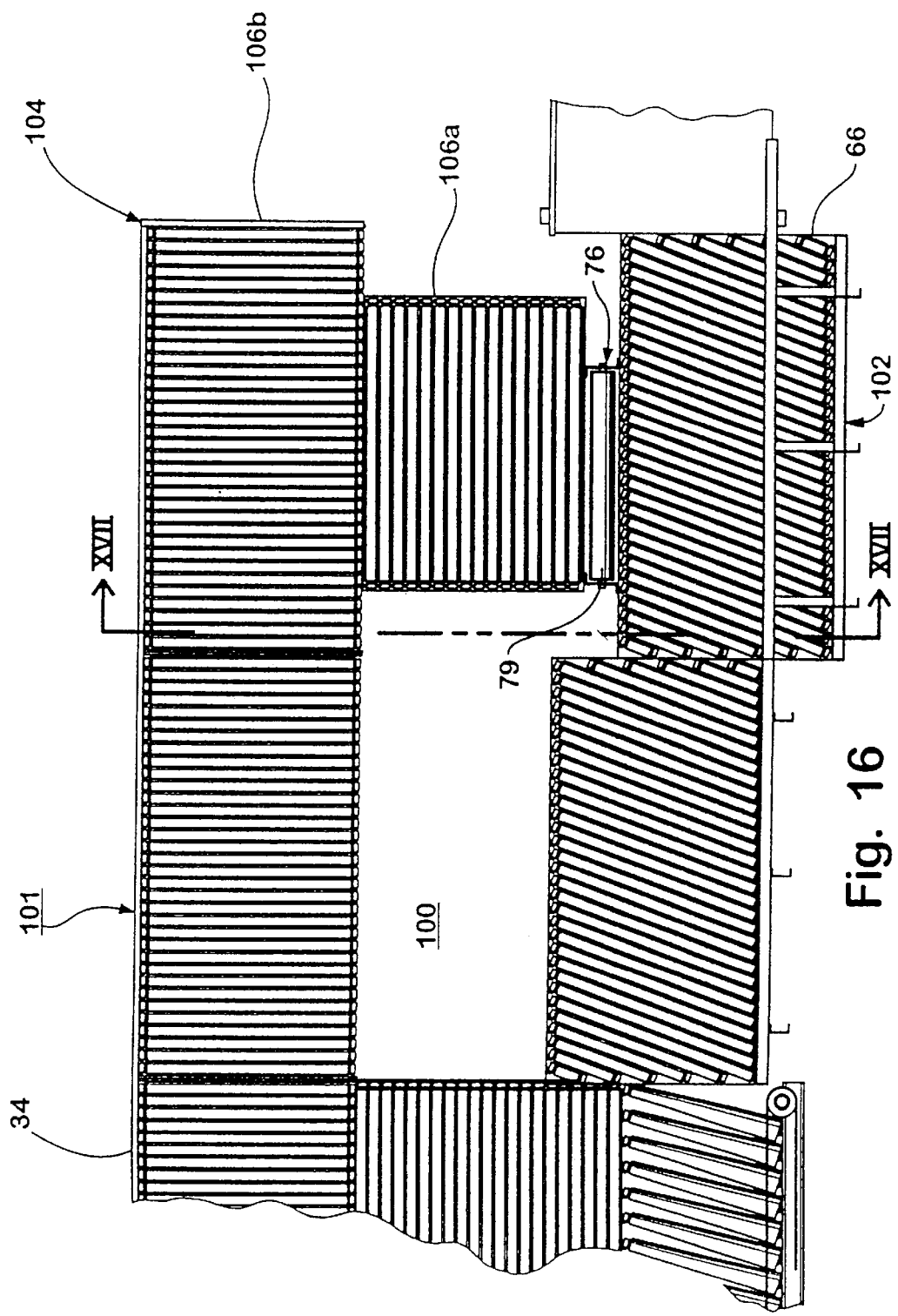

COMPACT ARTICLE UNSCRAMBLER

CROSS REFERENCE TO RELATED APPLICATION

This application is a divisional application of co-pending Ser. No. 09/131,917, filed on Aug. 10, 1998, now ABN by Dennis J. Schuitema, Ronald J. DeVree, and Curtis B. LeMay, which is a continuation-in-part of application Ser. No. 08/616,685, filed on Mar. 15, 1996, by Dennis J. Schuitema and Ronald J. DeVree, now U.S. Pat. No. 5,918,723, the entireties of both of which are incorporated by reference herein.

BACKGROUND OF THE INVENTION

This invention relates generally to conveyor systems and, in particular, to systems which receive packages in a cluster including side-by-side packages and which rearrange the packages into a single file, singulated stream.

In U.S. Pat. No. 5,415,281, which is commonly assigned with the present application, an article singulation conveyor is disclosed which utilizes tapered rollers which are driven at a uniform speed for the length of the conveyor but which produce a continuous speed increase laterally towards a vertical belt. The tapered rollers may be divided up into plural lanes of rollers. The speed increase across the conveyor bed tends to arrange packages in single file because one of a pair of side-by-side packages will move ahead of the other as both are urged in the direction of the vertical belt. The device disclosed in this patent is exceptionally effective if provided in sufficient length, such as 60-foot sections.

Some conveyor installations are restricted in the amount of space available for singulating clusters of packages. This is particularly a problem with modifications to existing installations, as well as new installations in existing facilities which are often constrained on space.

Rearrangement of clusters of articles into singulated single file is especially difficult for packages having one dimension that is significantly greater than its other dimensions. If several such long and slender articles are conveyed side-by-side, conventional article singulation conveyors have difficulty breaking up the side-by-side pair into single file. This is an especially onerous task in a singulation conveyor that is relatively short in length. Another problem that can occur is that packages having one long dimension can get oriented on the output of the singulation conveyor with the long dimension transverse the direction of travel of the conveyor. This can provide package jams, especially if the long dimension of the package is wider than a conveyor downstream of the singulation conveyor.

Thus, the need exists for a compact article singulation conveyor, or unscrambler, which is exceptionally effective in separating side-by-side packages into a single file of singulated articles without requiring a long footprint. Such a compact article singulation conveyor must be capable of breaking up pairs of side-by-side articles.

There also is a need for an article singulation device, or unscrambler, which has accumulation capabilities. System requirements typically specify a package throughput which the unscrambler must meet as a normal load and a much higher rate which must be met occasionally. While it would be possible to add additional unscrambler capacity in order to size the system to handle peak load, it would be desirable to size the unscrambler to meet normal, or base, load and incorporate an accumulation function in the unscrambler.

SUMMARY OF THE INVENTION

The present invention fulfills the need for a compact article singulation conveyor, or unscrambler, which is exceptionally effective in rearranging clusters of articles into a singulated single file of articles. The unscrambler may also provide accumulation to handle peak loads which exceed normal loads for which the system was designed to handle.

An article singulation conveyor according to the invention includes a receiving portion to which articles are delivered in random order including clusters of side-by-side articles and a discharge portion from which articles are discharged in a single file singulated stream. An article singulating portion is provided between the receiving and discharge portions. According to one aspect of the invention, the article singulating portion includes a first conveying member having a first traveling conveyor surface which travels longitudinally from the receiving portion to the discharge portion and a recirculation bed which removes side-by-side articles from a downstream portion of the first conveyor to an upstream portion of the first conveying surface. The recirculation bed may be made up of at least one peel-away conveyor having a second travelling conveying surface which travels away from the first conveying member to move side-by-side articles laterally off the first conveying surface. The recirculation bed may further include at least one coupling conveyor having a third travelling conveying surface which travels away from the second conveying surface upstream. The recirculation bed may further include at least one return conveyor having a fourth travelling conveying surface which travels from the third conveying surface to the first conveying surface. In this manner, clusters of articles tend to recirculate around the recirculation bed and the first conveying surface as individual articles of clusters are pulled away from the first conveying surface.

According to another aspect of the invention, the article singulating portion defines a generally planar circulus conveying surface. In this manner, with packages of non-uniform sizes, each identified by a machine-readable code on one side of the package supplied to the receiving portion with the machine-readable code in a particular orientation, packages can be unscrambled while maintaining the particular orientation of the package machine-readable codes. Additionally, such structure provides combined singulating and accumulating functions, whereby packages may be supplied at a rate which varies between an average rate and a momentary peak rate that is at least approximately 50% greater than the average rate by accumulating clusters of packages during rates that exceed the average rate and reducing the clusters when the rate returns toward the average rate. In this manner, peak loads can be accumulated on the unscrambler and the accumulated packages singulated as loads return toward normal.

According to another aspect of the invention, a package singulation conveyor includes a conveying surface traveling in a particular direction and a diverting surface. The diverting surface has at least a portion extending above the conveying surface and traveling upwardly and away from the conveying surface in a different direction normal to the particular direction. In this manner, when a package is traveling along the conveying surface having a portion which extends to the diverting surface, the package will be diverted from the conveying surface by the diverting surface. Because this aspect of the invention provides for diverting packages based upon contact with any portion of the package, the singulation conveyor removes side-by-side packages or packages which have a package dimension transverse the direction of travel of the conveying surface by operating on the transverse width of the package rather than on the center of gravity of the package. Therefore, even if the load is not distributed uniformly within the package, the package will be diverted if it is too wide in a direction transverse the direction of conveyor travel.

According to yet a further aspect of the invention, a method of conveying packages along a conveying surface includes providing a conveying surface and a diverting device, conveying packages along the conveying surface and diverting from the conveying surface with the diverting device, each package having a lateral dimension transverse the direction of travel of the conveying surface which is greater than or equal to a particular dimension. Any packages which are removed from the conveying surface are rotated and returned to the conveying surface. In this manner, packages which are rectangular with the long dimension traveling transverse the direction of travel will be removed and the packages returned to the conveying surface reoriented with the narrow dimensions transverse the conveying surface. The removed package can be returned upstream from the diverting device or returned to the conveying surface downstream of the diverting device. If returned upstream of the diverting device, it may be fed to an unscrambler in order to be processed along with other packages in a cluster. By reorienting packages which are traveling with the long dimension transverse the direction of travel of the conveying surface, packages which are too wide for downstream conveying surface dimensions will be reoriented in order to avoid jams and the like.

These and other objects, advantages and features of this invention will become apparent upon review of the following specification in conjunction with the drawings.

BRIEF DESCRIPTION OF THE DRAWINGS

FIG. 9 is the same view as FIG. 7 of an alternative embodiment thereof;

FIG. 11 is an enlarged end elevation of the area designated XI in FIG. 8 illustrating forces applied by the invention to a package;

FIG. 12 is the same view as FIG. 11 of an alternative embodiment thereof;

FIG. 16 is the same view as FIG. 7 of yet another alternative embodiment thereof;

FIG. 18 is a sectional view taken along the lines XVIII—XVIII in FIG. 7; and

FIG. 19 is a sectional view taken along the lines XIX—XIX in FIG. 9.

DESCRIPTION OF THE PREFERRED EMBODIMENT

Figure 1:
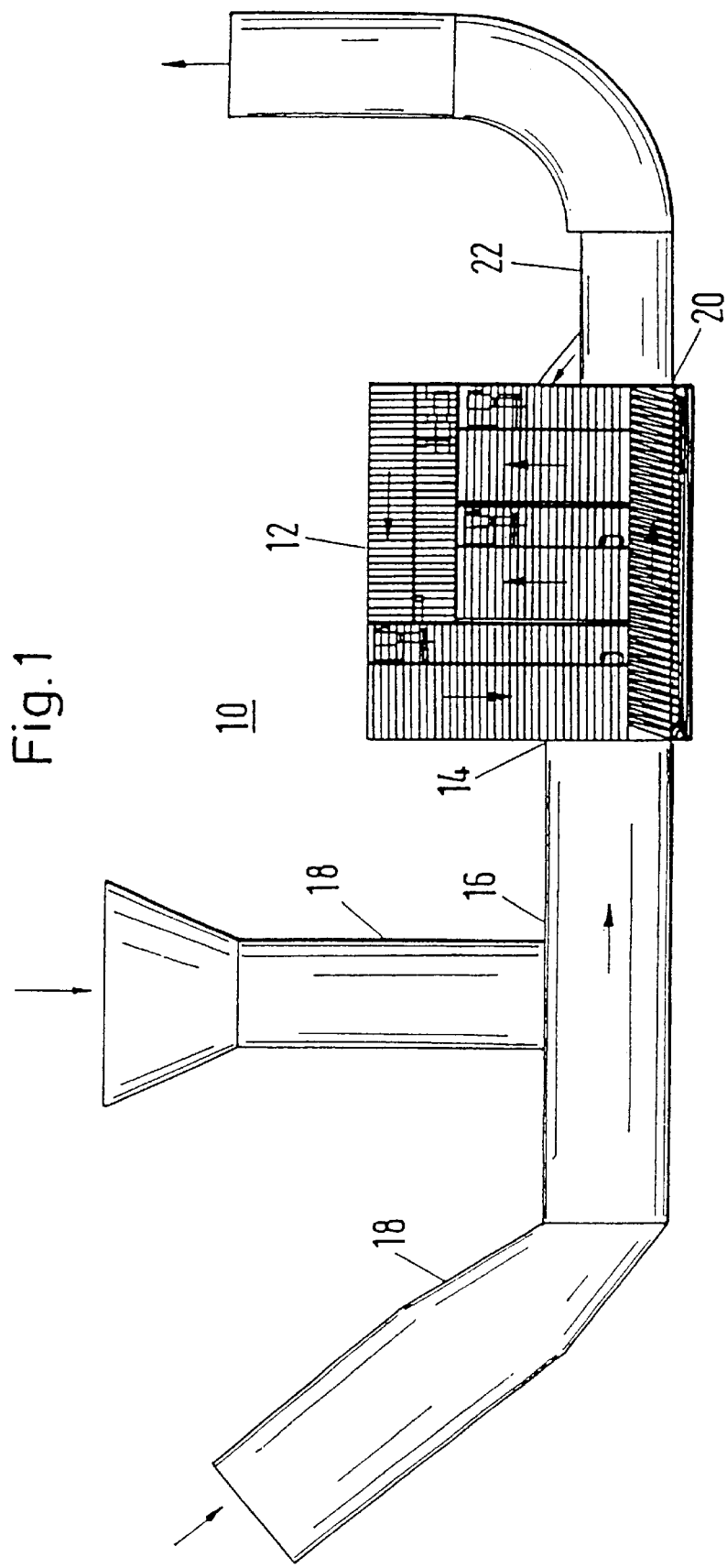
FIG. 1 is a top plan view of a conveyor system incorporating an article singulation and accumulation conveyor, according to the invention.

Referring now specifically to the drawings, and the illustrative embodiments depicted therein, a conveyor system 10 includes an article singulation and accumulation conveyor 12 having an inlet 14 which receives articles, typically in a cluster, from an infeed conveyor 16 (FIG. 1). Articles may arrive on infeed conveyor 16 from a plurality of chutes 18 and, thereby, have a random orientation and may be arranged side-by-side. Other inducts than chutes may be used. Article singulation conveyor 12 further includes an outlet 20 which delivers articles single file and singulated to a take-away conveyor 22. By singulation is meant articles which are arranged in single file and may, or may not, be separated by a gap.

Figure 2:
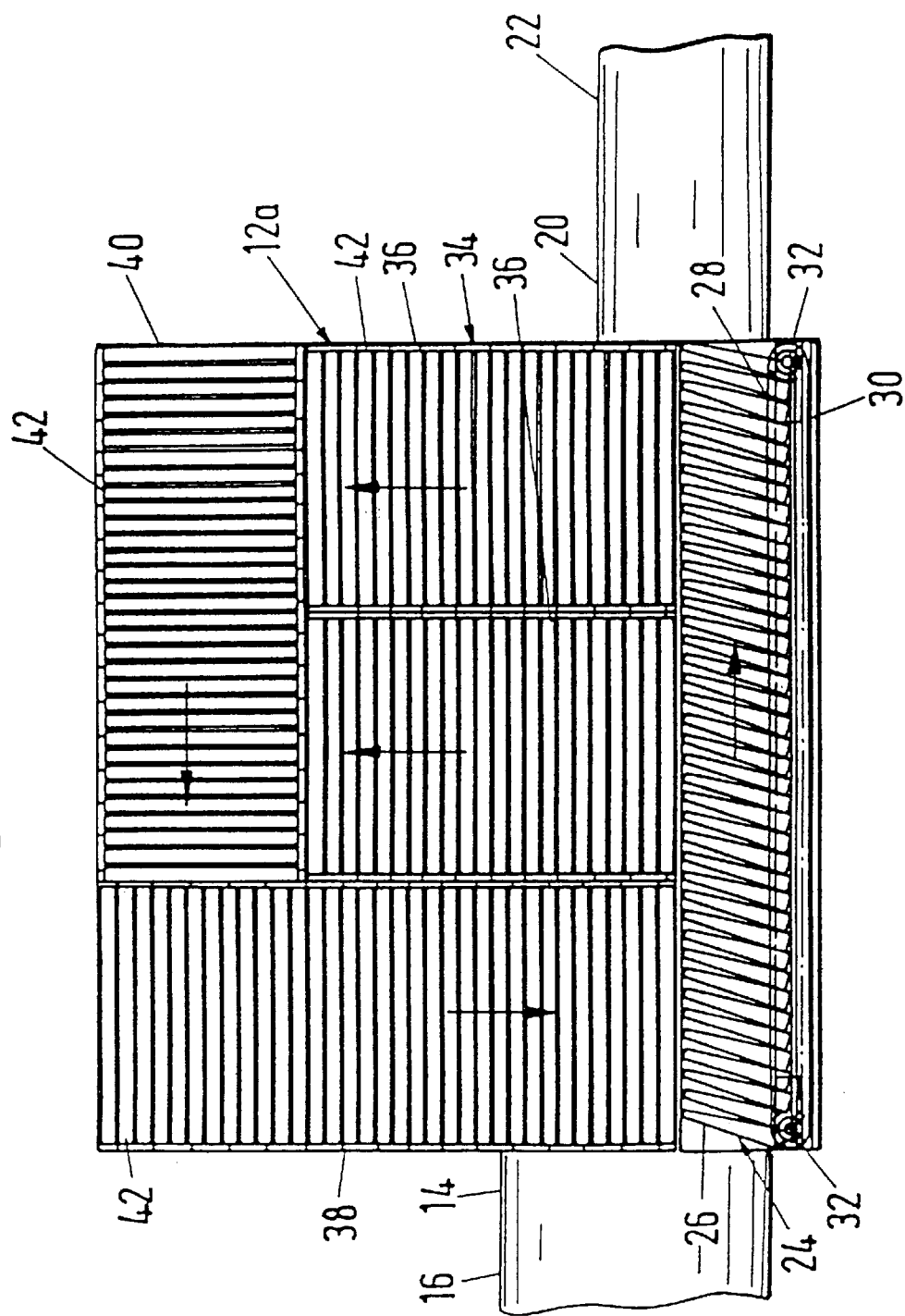
FIG. 2 is a top plan view of an article singulation and accumulation conveyor, according to the invention.

In a first embodiment, an article singulation and accumulation conveyor 12a includes an articulation bed 24 having a conveying surface made up of a plurality of generally parallel rollers 26 and a guide surface 28 which is longitudinally extending along the direction of article movement along the conveying surface of alignment bed 24 (FIG. 2). Rollers 26 are configured in order to urge articles laterally towards guide surface 28. This may be accomplished by various known techniques. In the illustrated embodiment, guide rollers 26 rotate about axes which are skewed with respect to guide surface 28. This tends to urge packages towards the guide surface. In order to further urge the articles towards the guide surface, rollers 26 may be tapered in order to produce a linear speed increase in the direction of the guide surface. This tends to separate side-by-side packages in the manner described in U.S. Pat. No. 5,415,281 issued to Eric R. Taylor, Curtis E. LeMay, Gerald A. Brouwer and Bernard H. Woltjer for a HIGH SPEED ARTICLE UNSCRAMBLER AND ALIGNER, the disclosure of which is hereby incorporated herein by reference. Alternatively, guide rollers 26 may be cylindrical; namely, having a consistent diameter across the roller. In the illustrated embodiment, guide surface 28 is defined by a vertical belt 30 which is movably supported by a pair of vertical axis pulleys 32. Preferably, guide surface 28 moves in the direction of product flow along the conveying surface of alignment 24 at the same, or greater, speed as the speed of articles propelled along the alignment bed conveying surface. In the illustrated embodiment, rollers 26 of alignment bed 24 are powered with a subjacent driven endless member such as a belt or padded chain.

Article singulation and accumulation conveyor 12a further includes a recirculation bed 34 which extends from alignment bed 24 in a direction opposite guide surface 28. In the illustrated embodiment, recirculation bed includes one or more peel-away conveyors 36 having conveying surfaces directing articles perpendicularly away from alignment bed 24. Recirculation bed 34 additionally includes at least one return conveyor 38 having a conveying surface which conveys articles perpendicularly toward alignment bed 24.

Recirculation bed 34 additionally includes at least one coupling conveyor 40 having a conveying surface which conveys articles from peel-away conveyors 36 to return conveyor 38. In the illustrated embodiment, coupling conveyor 40 has a conveying surface which conveys articles in a direction which is perpendicular to both peel-away conveyor 36 and return conveyor 38. In the illustrated embodiment, the conveying surfaces of peel-away conveyors 36, return conveyor 38, and coupling conveying 40 are defined by a multiplicity of powered cylindrical rollers 42 which are powered by a subjacent driven endless member, such as a belt or padded chain (not shown). Alternatively, rollers 26 and 42 may be individually powered by a line-shaft or other known propulsion means. In the illustrated embodiment, infeed conveyor 16 and take-away conveyor 22 are belt conveyors but other conveyors may be used.

Article singulation and accumulation conveyor 12*a* operates as follows. Clusters of articles being fed to inlet 14 by infeed conveyor 16 are urged in the direction of vertical guide surface 28 by the motion of the conveying surface of return conveyor 38 and the lateral bias of the conveying surface of alignment bed 24. Some side-by-side articles in the cluster will be broken apart by the combined action of rollers 26 and guide surface 28 in the manner described in the Taylor et al. '281 patent. Articles which remain side-by-side should come into contact with one of the peel-away conveyors 36, which will move the side-by-side article laterally away from the vertical belt 28 in a direction opposite guide surface 28. Articles removed in this manner will be discharged onto coupling conveyor 40 and from coupling conveyor 40 onto return conveyor 38 where the articles will be circulated back to alignment bed 24. As clusters of articles are received by article singulation conveyor 12*a*, the clusters tend to recirculate around alignment bed 24 and recirculation bed 34 as individual articles of the cluster are pulled away along alignment bed 24 and discharged in a single file singulated manner to outlet 20 and take-away conveyor 22.

Article singulation and accumulation conveyor 12*a* is defined by a series of traveling conveying surfaces which are substantially coplanar. This provides two advantages. As clusters are processed by the article singulation and accumulation conveyor 12*a*, the packages are maintained in a single orientation with upwardly-facing surfaces remaining upwardly. This is accomplished because the packages do not need to travel down chutes or other inclines which tend to tumble packages. Not only does tumbling packages pose a risk to damage to the contents thereof, it is common practice to apply machine-readable codes, such as a bar code and other optical magnetic codes, to the top surface of packages in order to allow the packages to be identified by a code reader. If packages are tumbled, the surface bearing the machine-readable code may no longer be facing upwardly which prevents the successful reading of the code by a code reader. This creates a non-compliant package which must be removed from the system and manually handled which may be a serious impediment to throughput.

An additional advantage to a coplanar article singulation conveyor is that clusters of articles can accumulate if the rate of packages being fed to the article singulation conveyor exceeds the output rate of the article singulation conveyor. As packages accumulate, it may be desirable to allow the packages to actually accumulate in a contact fashion with the clusters of packages stopping and/or backing up on the conveying surface in the direction opposite the traveling direction of the conveying surfaces. This can best be accomplished if there is controlled friction between the traveling conveying surface and the packages. One way this may be accomplished is by making the conveying surface from powered rollers as illustrated in FIG. 2. This is because there is a limited frictional engagement between steel rollers and packages. An alternative is to make one or more of the conveying surfaces from a belt of the type having a relatively low coefficient of friction whereby slippage between the belt and package may be accommodated. Such limited slippage belts are known in the art. Other traveling conveying surfaces may suggest themselves to the skilled artisan. Article singulation and accumulation conveyor 12*a* is capable of handling 10,000 packages per hour with spikes in package rate of up to 15,000 packages per hour and even 20,000 packages per hour for up to 15 seconds. This is a momentary increase in volume of at least 50% and even 100% for short duration spikes. This is accomplished by providing an article singulation device having accumulation capabilities.

Figure 3:
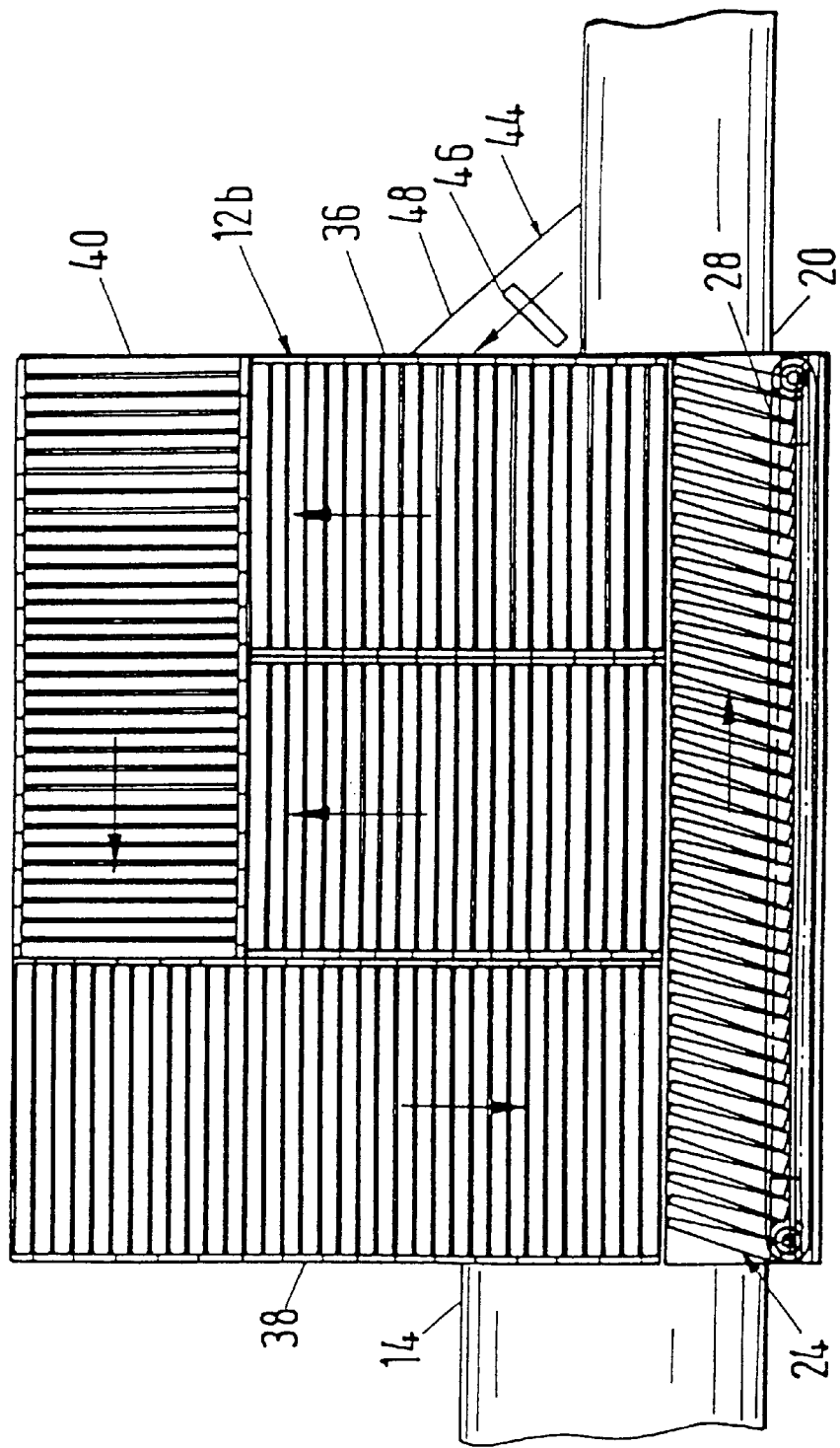
FIG. 3 is the same view as FIG. 2 of an alternative embodiment.

Occasionally, clusters of articles may, because of their mix of article sizes, be forced downstream, laterally off peel-away conveyors 36. In order to prevent such clusters from jamming, an article singulation conveyor 12*b* includes a reverse direction section 44 (FIG. 3). Reverse direction section 44 includes one or more powered rollers 46 which move product in the direction indicated by the arrow in FIG. 3. Although only one powered roller 46 is illustrated in FIG. 3, reverse direction section 44 may be entirely made up of such powered rollers. Reverse direction section 44 additionally includes an outer vertical wall 48 in order to further assist in returning packages to peel-away conveyor 36.

Figure 4:
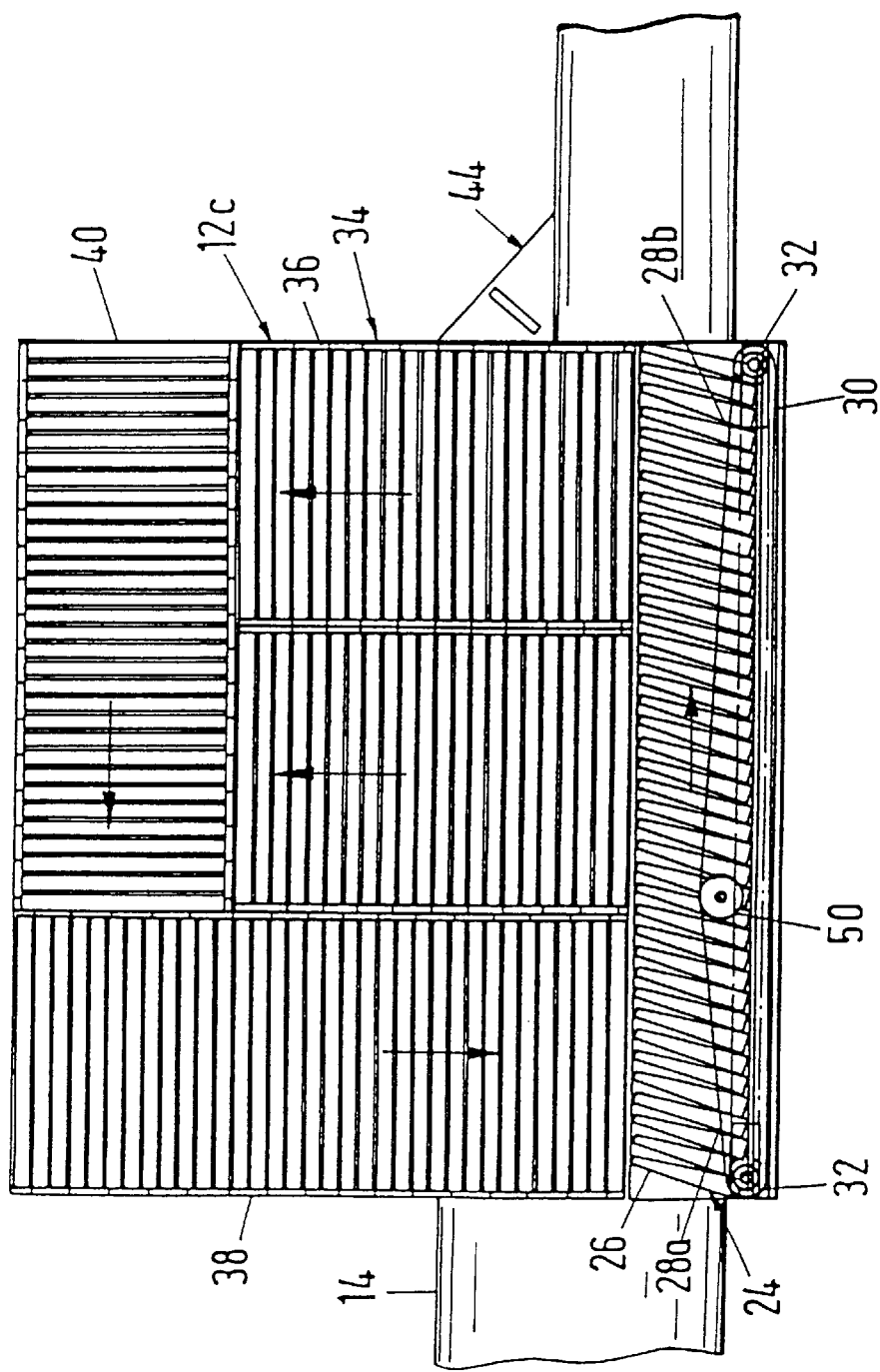
FIG. 4 is the same view as FIGS. 2 and 3 of a second alternative embodiment.

In a third embodiment, an article singulation and accumulation conveyor 12*c* has a third vertical pulley 50 for movably supporting guiding vertical belt 30 (FIG. 4). Vertical pulley 50 is laterally offset from the location of vertical pulleys 32 in the direction of recirculating bed 34. Because of such offset, vertical pulley 50 divides guide surface 28 into a first guide surface portion 28*a* and a second guide surface portion 28*b*. Guide surface portion 28*a* slopes in the direction of recirculating bed 34. Because guide surface 28*a* slopes in the direction of the recirculation conveyor, it tends to throttle package clusters in a confined area between pulley 50 and peel-away conveyors 36. This increases the likelihood that one of the peel-away conveyors will remove any side-by-side articles from any articles in contact with the guide surface. By positioning vertical roller 50 at a suitable distance from the peel-away conveyors, side-by-side packages can be more effectively separated. In the embodiment illustrated in FIG. 4, vertical pulley 50 is fixedly mounted. However, vertical pulley 50 could alternatively be adjustably mounted, in a manner which would be within the capabilities of the skilled artisan, if the mix of articles handled by the conveyor system changes in a predictable fashion. For example, a warehouse may handle one particular product mix in the summer and a different product mix in the winter. The lateral position of vertical pulley 50 could be modified in order to accommodate such change in product mix.

Figure 5:
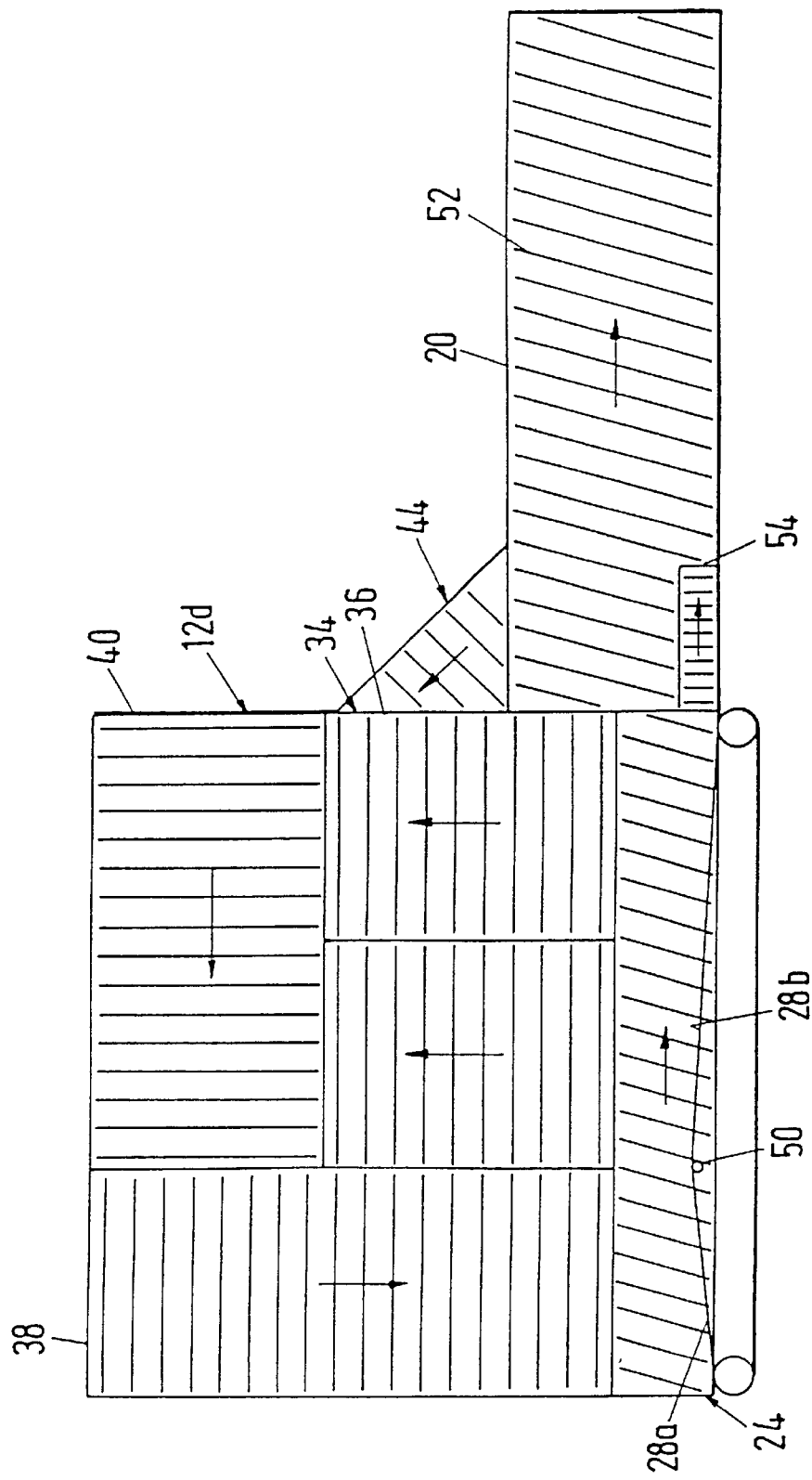
FIG. 5 is the same view as FIGS. 2–4 of a third alternative embodiment.

In another embodiment, an article singulation and accumulation conveyor 12*d* includes an outlet 20 made up of a multiplicity of skewed rollers 52 which extend partially or fully across the conveying surface and a multiplicity of shorter rollers 54 which extend partway across the conveying surface (FIG. 5). Rollers 54 are in line with alignment bed 24. Rollers 54 are operated at a slower speed than rollers 52. This provides a drag on packages being discharged directly from alignment bed 24 while allowing packages which are side-by-side with packages being discharged from the alignment bed to be moved forward thereof. This provides an additional separation means to separate side-by-side packages which are not separated by the remaining portion of article circulation conveyor 12d.

As an alternative to, or in addition to, such slower speed bed, a plurality of protrusions may be provided extending inwardly from the side of outlet 20 in line with guidance surface 28, or extending upwardly between rollers 52 slightly above the conveying surface. Such protrusions would be configured to slow down, but not completely stop, articles being discharged from alignment bed 24 in order to allow a side-by-side article to move ahead of the article discharged by the alignment bed. In this manner, additional separation means are provided for further separating side-by-side articles which are not separated by the remainder of article singulation conveyor.

An article singulation conveyor, according to the invention, has been successfully built and tested and found to be exceptionally effective in repositioning clusters of articles into singulated, single file arrangements.

Modifications may suggest themselves to those of ordinary skill in the art. For example, the roller, or rollers, 26 of peel-away conveyors 36 closest to alignment bed 24 may be made from a high-friction material in order to further assist in peeling away side-by-side articles.

Figure 6:
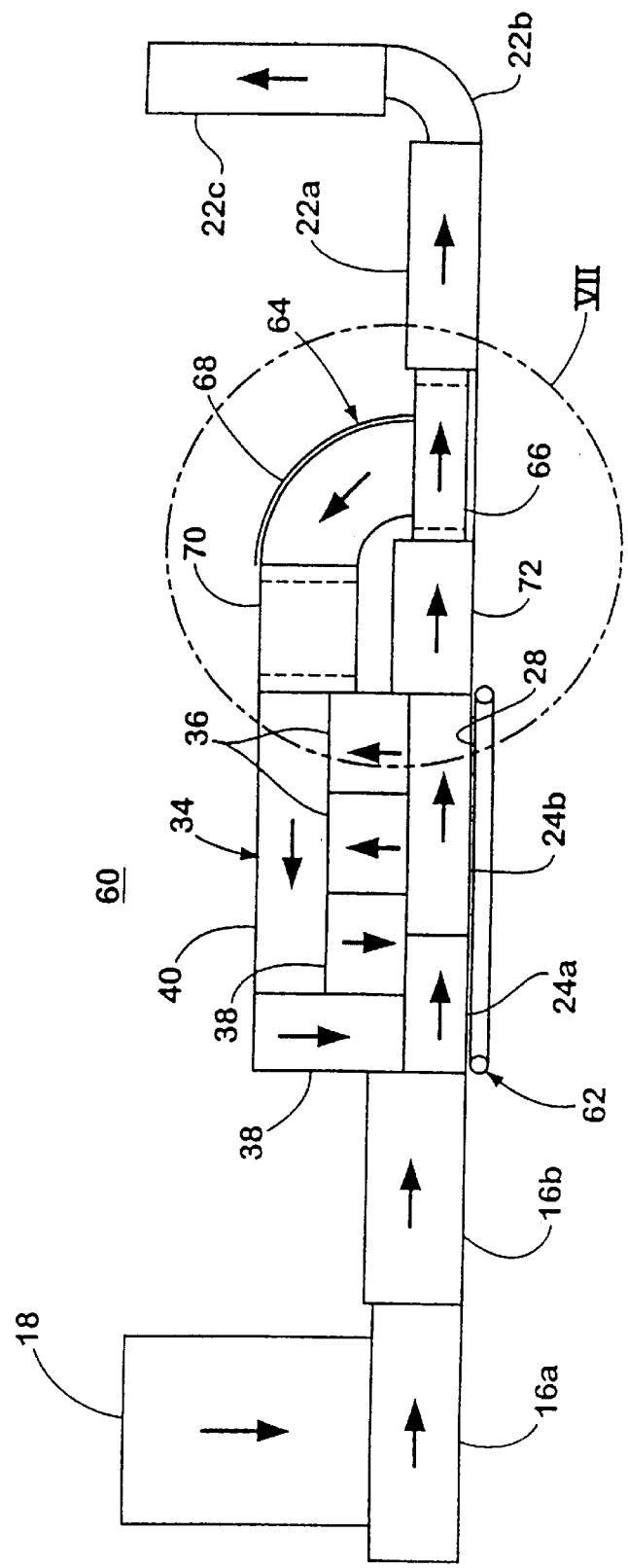
FIG. 6 is the same view as FIG. 1 of an alternative embodiment thereof.
Figure 7:
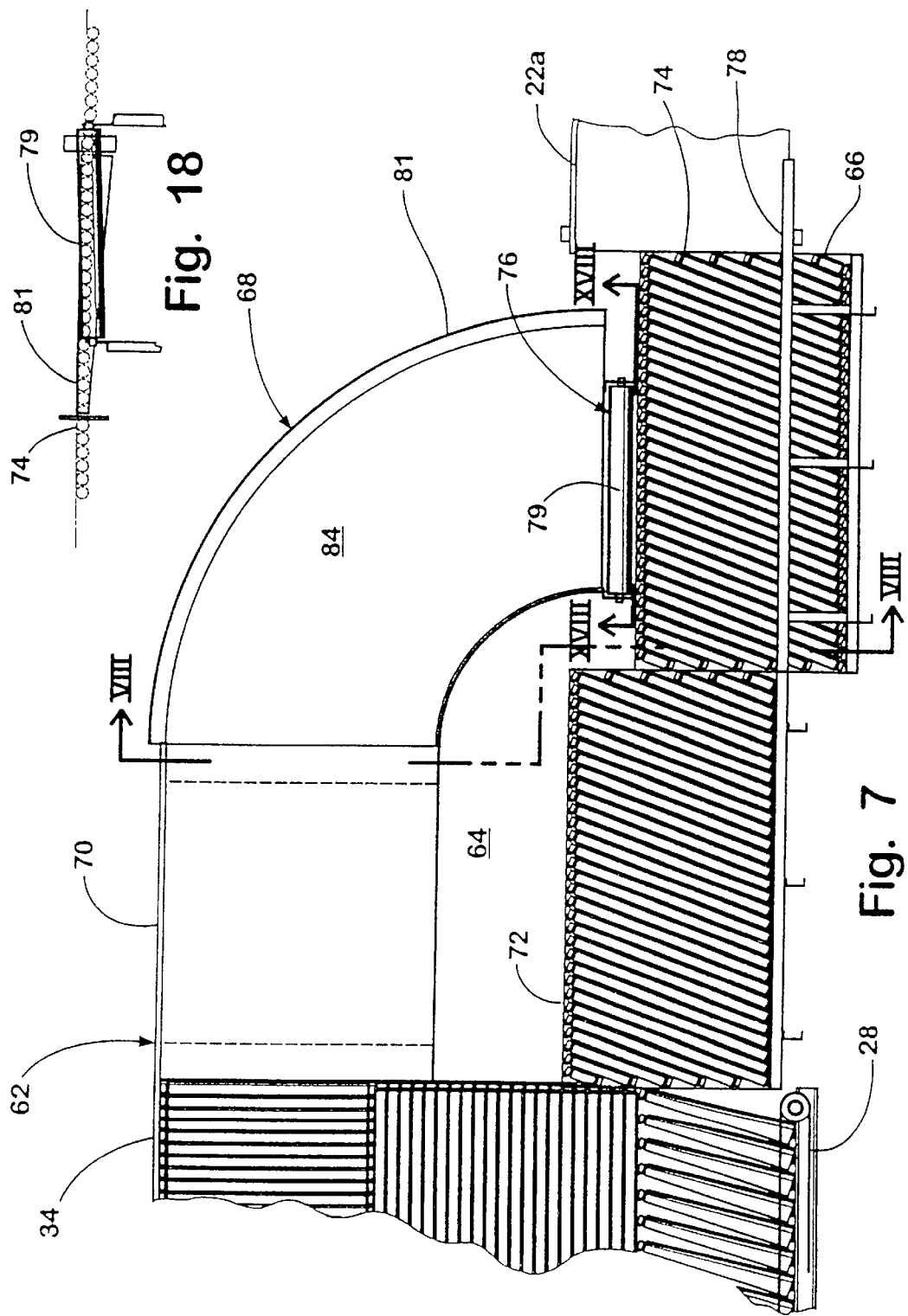
FIG. 7 is an enlarged view of the area designated VII in FIG. 6.
Figure 8:
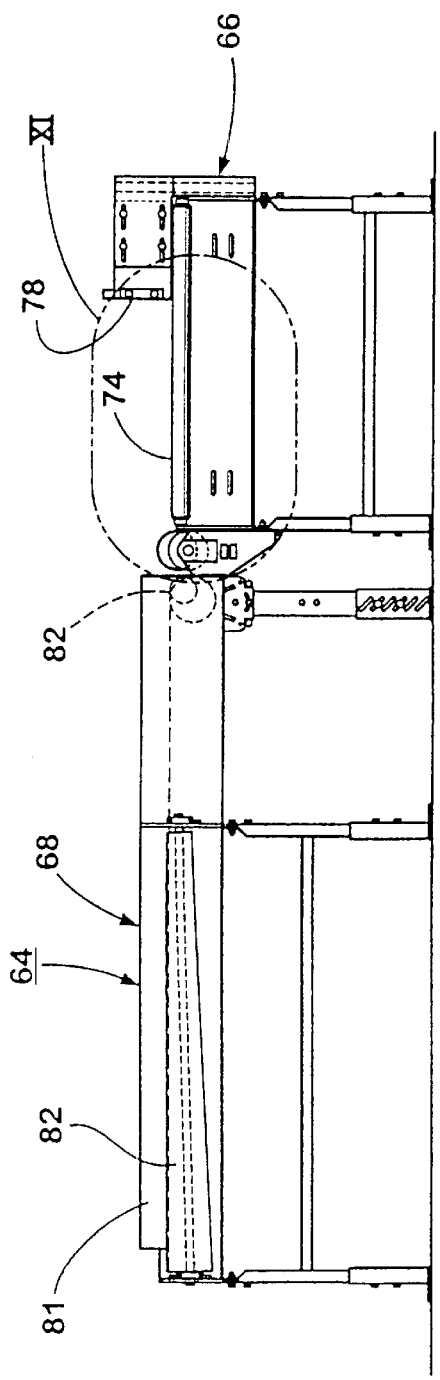
FIG. 8 is a sectional view taken along the lines VIII—VIII in FIG. 7.
Figure 10:
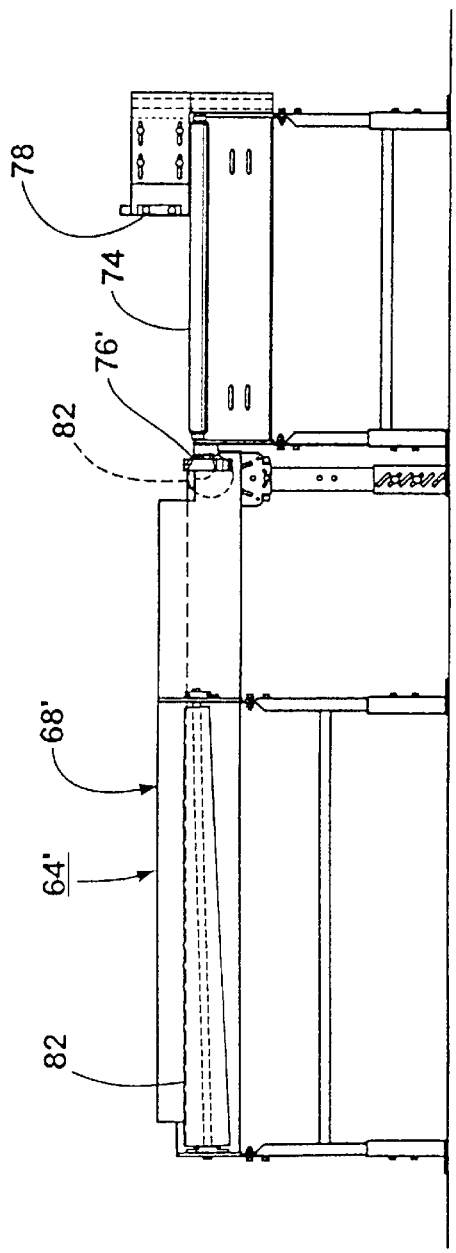
FIG. 10 is a sectional view taken along the lines X—X in FIG. 9.

An alternative conveying system 60 includes an article singulation and accumulation conveyor 62 made up of a pair of alignment bed sections 24a, 24b, and a recirculation bed 34 made up of a pair of peel-away conveyors 36, a pair of return conveyors 38 and a coupling conveyor 40 operating in the general manner previously described (FIG. 6). A guidance surface 28 is also illustrated in the form of a traveling vertical belt also in the manner previously described. Article singulation and accumulation conveyor 62 further has an output section 64 made up of a diverting section 66, a reorienting section 68 and a return section 70. Diverting section 66 is illustrated as being connected with alignment bed section 24a by a connecting conveyor 72. Diverting section 66 includes a conveying surface 74 for conveying packages from connecting conveyor 72 to a take-away conveyor section 22a and a diverter 76 positioned with respect to conveying surface 74 in a manner which will be described (FIG. 7). Diverting section 66 may additionally include a vertical guide rail 78. In the illustrated embodiment, conveying surface 74 is made up of a series of skewed powered rollers which are oriented to urge packages against the surface of vertical guardrail 78. However, conveying surface 74 could alternatively be a belt conveyor, particularly one having a surface providing limited frictional engagement with packages being conveyed there along.

In the illustrated embodiment, diverter 76 is defined by a diverting cylinder 79 with a rotating surface 80 which extends above conveying surface 74 and moves upwardly and away from conveying surface 74. With this configuration, a package having a portion which substantially engages rotating surface 80 will be diverted. One example illustrated in FIGS. 11 and 12 includes a package P having a dimension D in a direction transverse the direction of travel of conveying surface 74 which is greater than the separation distance between guide rail 78 and cylinder 79. In this example, an outer portion of the package will engage surface 80. The weight of the package W will create a force $F_W$ in the direction of diverter 76 which will result in an outward force $F_O$ directed away from conveying surface 74. Outward force $F_O$ pulls package P onto the diverter 76 where it is completely removed from conveying surface 74. In the embodiment illustrated in FIG. 7, the diverted package is deposited on a reorienting section 68 which rotates the package 90 degrees from its orientation on conveying surface 74. The reoriented package is returned to recirculation bed 34 by return conveyor 70. When a pair of side-by-side packages are discharged to connecting conveyor 72 by alignment bed 24b, a portion of the outermost package may contact diverter 76 at which case the force $F_O$ created between the package and diverting surface 80 will divert the outermost package onto reoriented section 68. The package will then be returned to recirculation bed 34 by return conveyor 70.

As illustrated in FIG. 18, diverting cylinder 79 is skewed in the direction of travel of conveying surface 74 with the upstream end of diverting cylinder 79 downward at or below the level of conveying surface 74 and the downstream end thereof above the conveying surface. This orientation allows packages to engage diverter 76 without abutting the upstream end of diverting cylinder 79. As a portion of a package encounters diverting cylinder 79, it will override the upstream end of the cylinder and begin to divert surface 80 as the package continues to travel downstream. Eventually, the engaging portion of the package is sufficiently supported by the diverting cylinder that the force $F_O$ will be sufficient to divert the package from the diverting section onto reorienting section 68. In the illustrated embodiment, reorienting section 68 may be a belt turn conveyor of the type marketed by Mannesmann Dematic Rapistan Corp. having a pair of tapered belt support pulleys 82 and a continuous belt supported by the pulleys for traveling there along. One or both pulleys 82 are powered from an electric motor, or the like, in order to propel the belt surface 84. Alternatively, reorienting section 68 could be a turn defined by a series of powered rollers of the type known in the art. Return conveyor 70 may be a belt conveyor or powered roller conveyor, or the like.

In an alternative embodiment (FIG. 9), a conveying system 60' includes an article singulation and accumulation conveyor 62' having an output section 64' made up of a diverting section 66' and reorienting section 68' which are substantially the same as those illustrated in FIG. 7 except that one pulley 82 of belt turn conveyor 81 defines diverter 76' and belt surface 84 defines diverting surface 80. In this manner, the necessity for a separate diverting cylinder 79 is eliminated. Because the upper surface of pulleys 82 are substantially horizontal, an elevating wheel 86 is provided upstream of pulley 82 in order to elevate packages having a portion which would contact belt turn conveyor 81 sufficiently high to rest upon the belt surface. Otherwise, packages may abut the end of belt turn conveyor 81 rather than being diverted thereby.

An additional function is performed by output sections 64 and 64' in which a package P is traveling along connecting conveyor 72 with the long dimension of the package transverse the direction of conveyance. Such orientation is undesirable because it may create a jam condition if the package continues in such orientation on take-away conveyor 22a. In order to reduce the likelihood of such occurrence, the outer portion of package P will contact diverter 76, 82 in a manner illustrated in FIG. 11 which will cause the package to be diverted onto reorienting section 68', as illustrated in FIG. 9, and the package rotated 90 degrees prior to being returned to recirculation bed 34 by return conveyor 70. Thus, it is seen that output sections 64, 64' perform two useful functions to ensure that singulated packages will be delivered to take-away conveyor 22a in orientation with exceptionally long packages oriented with their axes of elongation aligned with the direction of travel of the conveying surfaces.

Figure 13A:
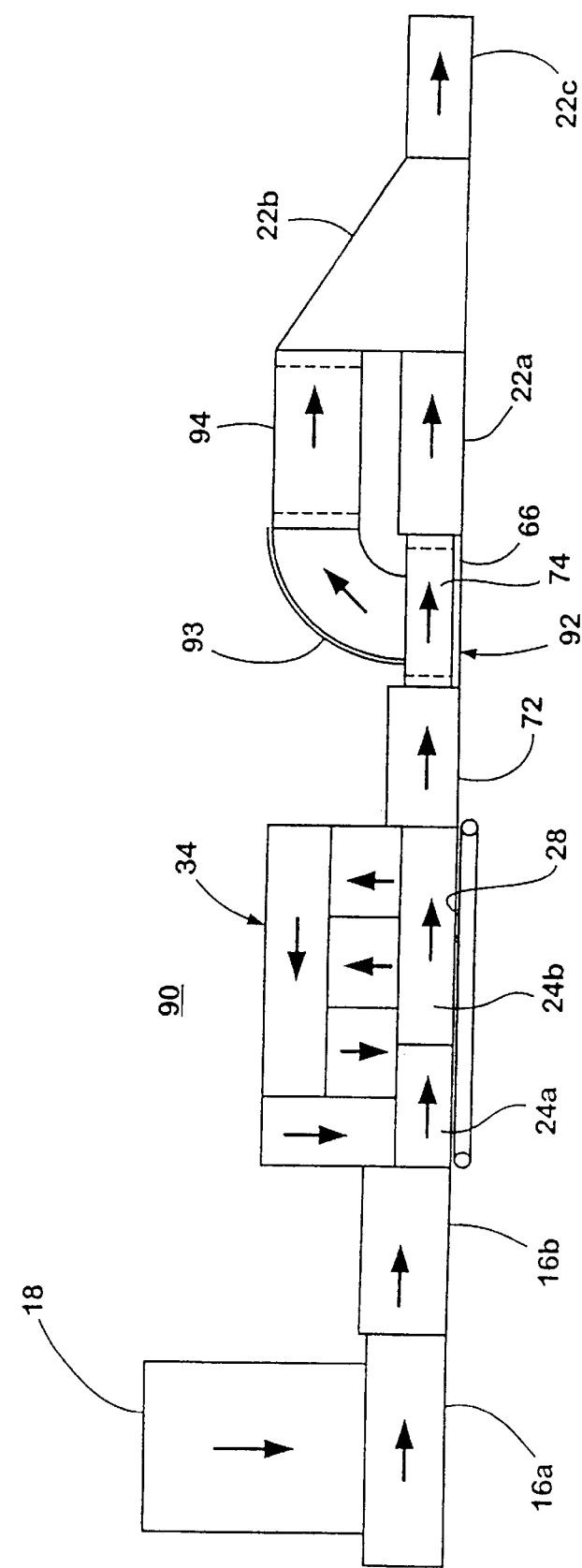
FIG. 13 is the same view as FIG. 6 of an alternative embodiment thereof.
Figure 13B:
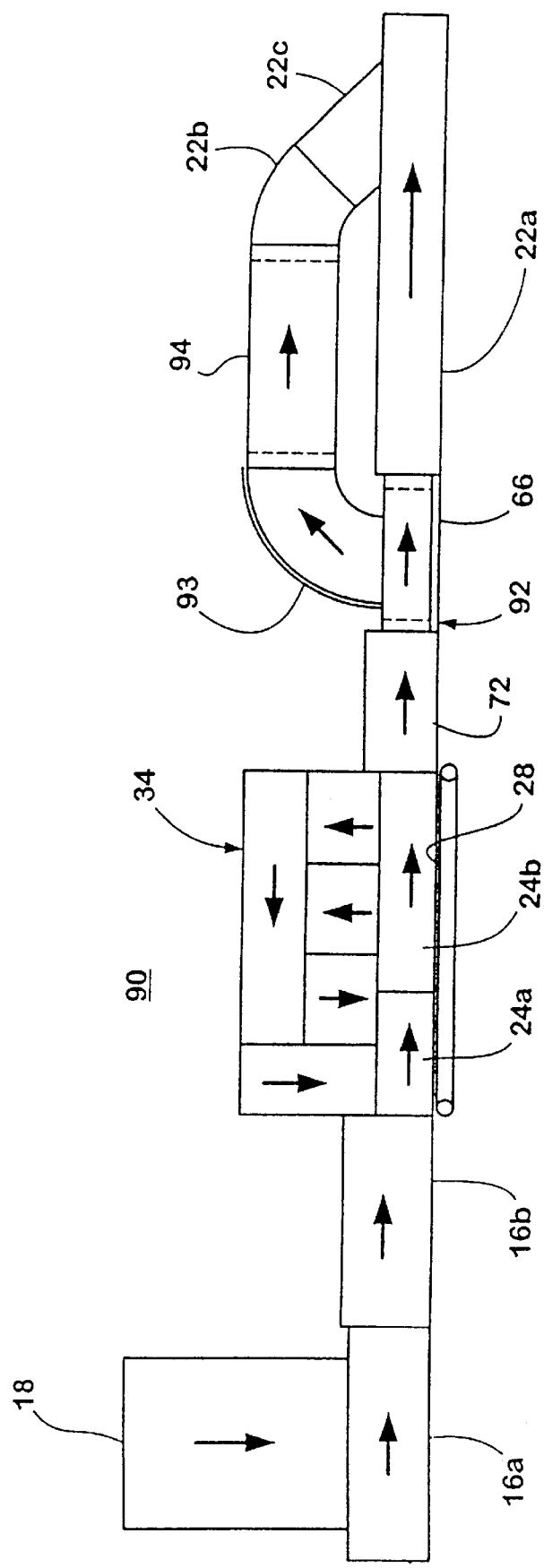

A conveying system 90 illustrated in FIG. 13 has an output section 92 including a diverting section 66 and a reorienting section 93 which reorients packages 90 degrees from the orientation that the packages were traveling on conveying surface 74. Output section 92 includes a connecting conveyor 94 which connects the output of reorienting section 93 with take-away conveyor section 22c. In this manner, rather than inserting the packages diverted from diverting section 66 and reoriented by the reorienting section with the recirculation bed 34 which is upstream of diverting section 66, reorienting section 93 and output section 92 insert the reoriented diverted packages downstream of the diverting section.

Figure 14:
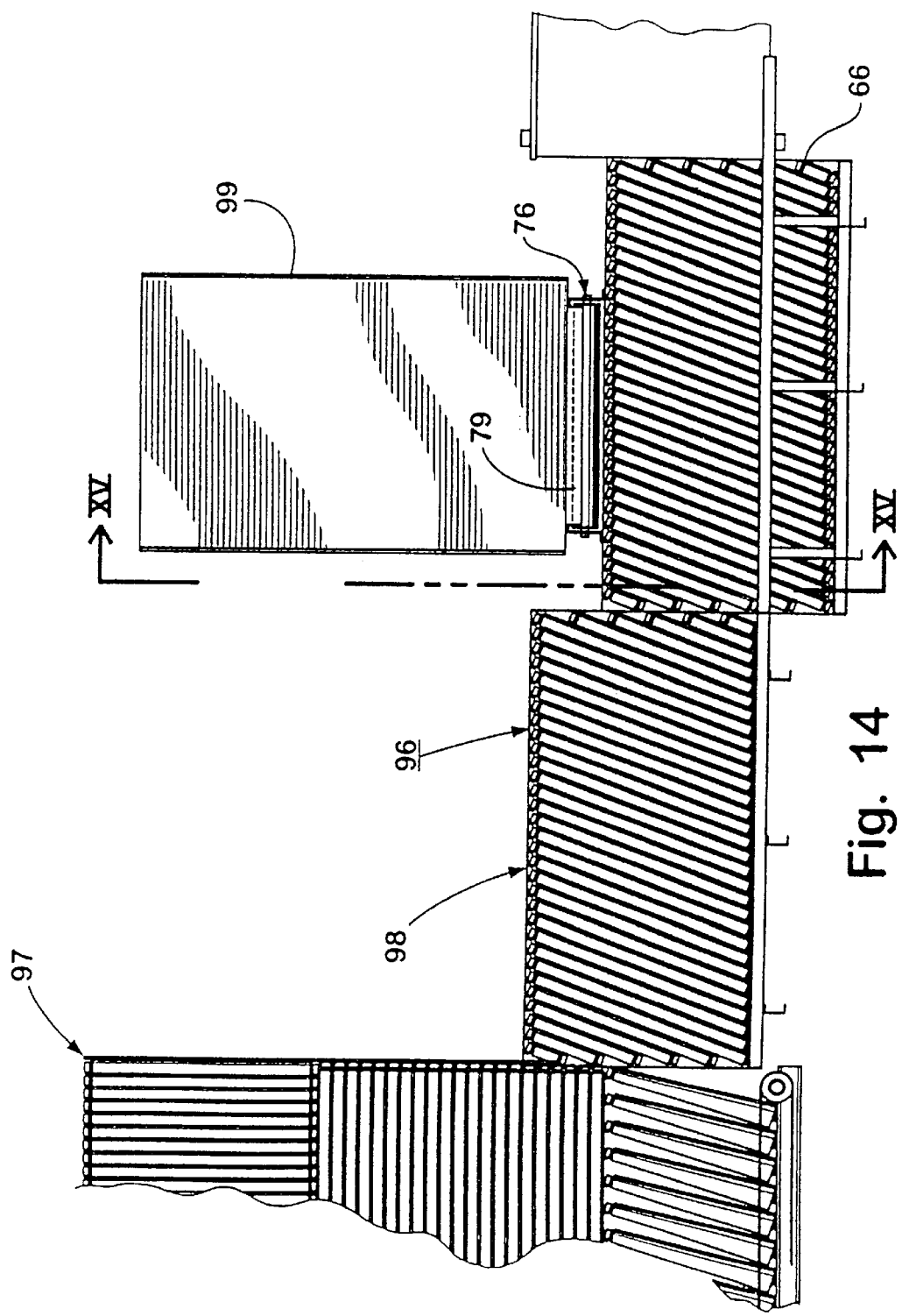
FIG. 14 is the same view as FIG. 7 of another alternative embodiment thereof.
Figure 15:
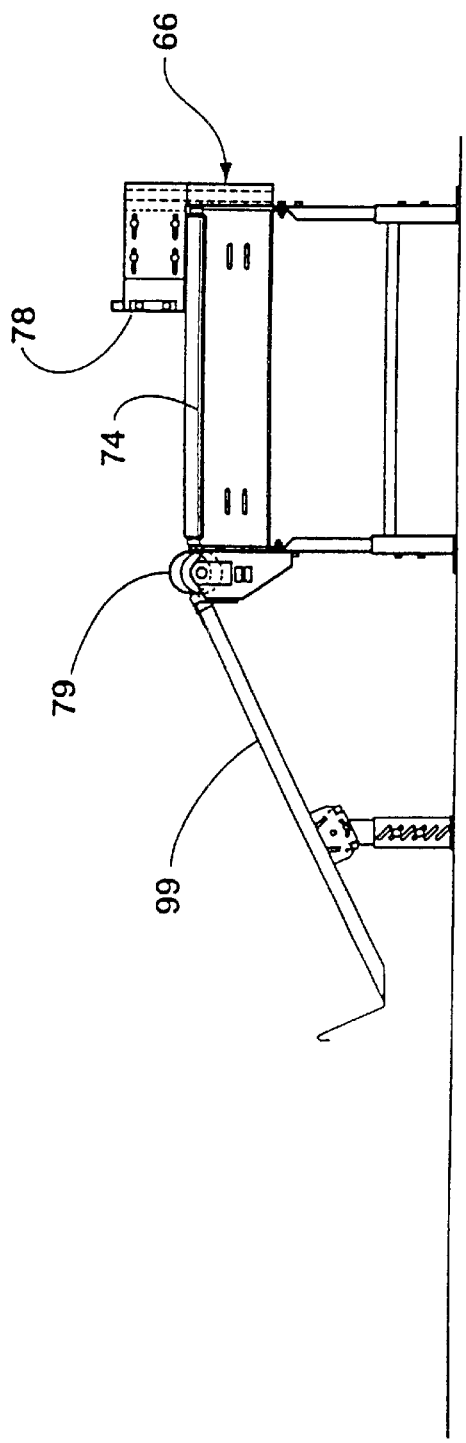
FIG. 15 is a sectional view taken along the lines XV—XV in FIG. 14.

In yet an alternative embodiment illustrated in FIGS. 14 and 15, a conveying system 96 has an article singulation and accumulation conveyor 97 including an output section 98 with a discharge chute 99 downstream from diverter 76. Packages which are diverted from conveying surface 76 by diverting cylinder 79 are retained on discharge chute 99 for manual removal.

Figure 17:
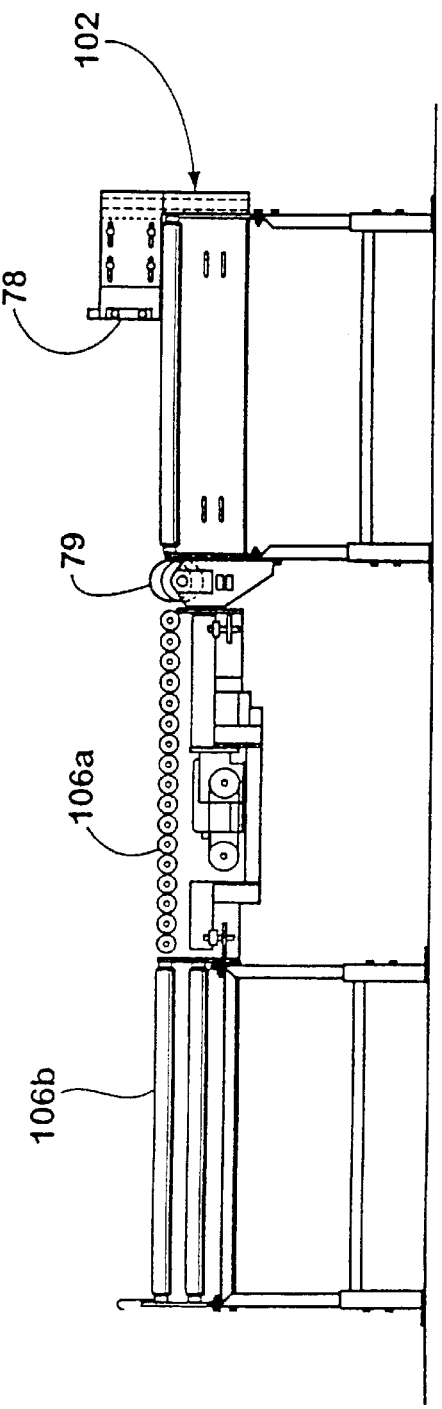
FIG. 17 is a sectional view taken along the lines XVII—XVII in FIG. 16.

A conveying system 100 illustrated in FIGS. 16 and 17 has an article singulation conveyor 101 with an output section 102. Output section 102 includes a diverting section 66 and return assembly 104 which returns packages diverted by diverter 76 back to recirculation bed 34. Return assembly 104 includes a series of substantially coplanar conveying sections 106a and 106b which return packages diverted by diverter 76 to recirculation bed 34 without substantial rotation of the packages.

Other embodiments will suggest themselves to the skilled artisan. For example, a removal section which includes a first conveying lane having a conveying surface with a higher coefficient of friction than that of a second conveying lane as disclosed in U.S. Pat. No. 5,701,989 may be used instead of alignment bed 24, 24a, 24b. The use of a reorienting system, according to the present invention, may incorporate other diverting systems, such as a fall-away mechanism of the type disclosed in U.S. Pat. No. 5,222,586 which diverts packages on the basis of location of the center of gravity rather than physical contact with the package. Other changes will suggest themselves to the skilled artisan.

Changes and modifications in the specifically described embodiments can be carried out without departing from the principles of the invention, which is intended to be limited only by the scope of the appended claims, as interpreted according to the principles of patent law including the doctrine of equivalents.

The embodiments of the invention in which an exclusive property or privilege is claimed are defined as follows:

1. A package singulation conveyor, comprising:
 a conveying surface traveling in a particular direction; and
 a diverting surface having at least a portion extending above said conveying surface and traveling upwardly and away from said conveying surface in a direction generally normal to said particular direction;
 wherein packages traveling along said conveying surface having a portion extending to said diverting surface will be diverted from said conveying surface by said diverting surface, and wherein said diverting surface is defined by a rotating cylinder, wherein said rotating cylinder is inclined with an end upstream with respect to said particular direction being lower than an opposite end thereof.

2. The package singulation conveyor in claim 1 including a high friction lagging on said diverting surface.

3. The package singulation conveyor according to claim 1, further comprising a curved conveyor rotating the diverted packages and means for returning the rotated packages to the conveying surface.

4. The package singulation conveyor in claim 3 wherein said curved conveyor comprises a belt turn conveyor assembly.

5. A method of removing from a conveying surface side-by-side packages and any package having a lateral dimension with respect to the direction of travel of said conveying surface which exceeds a particular dimension, comprising:
 providing a vertical guide surface adjacent one side of the conveying surface and a diverting device laterally spaced from said guide surface a distance substantially equal to the greatest lateral package dimension transverse the direction of travel of the conveying surface that is to travel downstream of the conveying surface, said diverting surface including at least a portion extending above said conveying surface;
 conveying packages along the conveying surface;
 diverting off the conveying surface any packages having any portion contacting said diverting device; and
 rotating packages diverted from the conveying surface and returning the rotated packages to the conveying surface.

6. The method of removing packages in claim 5 including returning the rotated packages to the conveying surface upstream of said diverting device.

7. The method of removing packages in claim 5 including returning the rotated packages to the conveying surface downstream of said diverting device.

8. A method of conveying packages along a conveying surface, comprising:
 providing a conveying surface and a diverting device;
 conveying packages along the conveying surface and diverting from said conveying surface with said diverting device each package having a lateral dimension transverse the direction of travel of said conveying surface which is greater than or equal to a particular dimension, said diverting surface including a driven surface having at least a portion extending above said conveying surface; and
 rotating packages removed from the conveying surface and returning the rotated packages to the conveying surface downstream of said diverting device.

9. The package singulation conveyor according to claim 1, further comprising a vertical guide surface, said vertical guide surface spaced from said diverting surface across said conveying surface a particular distance wherein a package having lateral dimension in said transverse direction in which is at least as great as said particular distance will be diverted by said diverting surface to said rotating device.

10. The package singulation conveyor according to claim 9, further comprising a guide rail, said guide rail including said vertical guide surface.

11. The package singulation conveyor according to claim 1, wherein said diverting surface has a coefficient of friction which is higher than a coefficient of friction of said conveying surface.

12. The package singulation conveyor according to claim 1, wherein said conveying surface includes an upstream portion relative to said diverting surface and a downstream portion relative to said diverting surface, said rotating device rotating said packages and directing said packages to said upstream portion.

13. The package singulation conveyor according to claim 1, wherein said conveying surface includes an upstream portion relative to said diverting surface and a downstream portion relative to said diverting surface, said rotating device rotating said packages and directing said packages to said downstream portion of said conveying surface.

14. The method according to claim 7, wherein said rotating includes rotating the packages approximately one quarter turn.

15. The package singulation conveyor according to claim 3, wherein said curved conveyor rotates the packages approximately one quarter turn and then returns said packages to said conveying surface.

16. A package singulation conveyor comprising:

a conveying surface traveling in a particular direction;

a diverting surface having at least a portion extending above said conveying surface and traveling upwardly and away from said conveying surface in a direction generally normal to said particular direction;

wherein packages traveling along said conveying surface having a portion extending to said diverting surface will be diverted from said conveying surface by said diverting surface, and wherein said diverting surface is defined by a rotating cylinder; and a rotating device rotating the diverted packages and returning the rotated packages to the conveying surface, wherein said rotating device comprises a radial belt turn conveyor.

17. The package singulation conveyor according to claim 3, wherein said rotating device returns the rotated packages upstream of said diverting device.

18. The package singulation conveyor according to claim 17, wherein said diverting device returns rotated packages to the conveying surface downstream of said diverting device.

19. The package singulation conveyor according to claim 16, wherein said diverting surface has a higher coefficient of friction than a coefficient of friction of said conveying surface.

20. The conveying apparatus according to claim 16, wherein said diverting surface comprises a cylinder.

21. The conveying apparatus according to claim 20, wherein said cylinder is inclined with an upstream end being lower than an opposite end thereof.

* * * * *

UNITED STATES PATENT AND TRADEMARK OFFICE
CERTIFICATE OF CORRECTION

PATENT NO. : 6,622,847 B2  Page 1 of 1
APPLICATION NO. : 09/921720
DATED : September 23, 2003
INVENTOR(S) : Schuitema et al.

It is certified that error appears in the above-identified patent and that said Letters Patent is hereby corrected as shown below:

<u>Column 1:</u>
Line 8, "B." should be --E.--.

Signed and Sealed this

Fifteenth Day of August, 2006

JON W. DUDAS
*Director of the United States Patent and Trademark Office*